(12) United States Patent
Ahmad

(10) Patent No.: US 9,926,787 B2
(45) Date of Patent: Mar. 27, 2018

(54) COOLANT BRIDGING LINE FOR A GAS TURBINE, WHICH COOLANT BRIDGING LINE CAN BE INSERTED INTO A HOLLOW, COOLED TURBINE BLADE

(71) Applicant: Siemens Aktiengesellschaft, Munich (DE)

(72) Inventor: Fathi Ahmad, Kaarst (DE)

(73) Assignee: Siemens Aktiengesellschaft, Munich (DE)

( * ) Notice: Subject to any disclaimer, the term of this patent is extended or adjusted under 35 U.S.C. 154(b) by 494 days.

(21) Appl. No.: 14/404,629

(22) PCT Filed: May 14, 2013

(86) PCT No.: PCT/EP2013/059859
§ 371 (c)(1),
(2) Date: Nov. 30, 2014

(87) PCT Pub. No.: WO2013/182381
PCT Pub. Date: Dec. 12, 2013

(65) Prior Publication Data
US 2015/0110601 A1    Apr. 23, 2015

(30) Foreign Application Priority Data
Jun. 6, 2012    (DE) .................. 10 2012 209 549

(51) Int. Cl.
*F01D 9/02*    (2006.01)
*F01D 9/06*    (2006.01)
(Continued)

(52) U.S. Cl.
CPC .............. *F01D 5/147* (2013.01); *F01D 5/187* (2013.01); *F01D 9/02* (2013.01); *F01D 9/065* (2013.01);
(Continued)

(58) Field of Classification Search
None
See application file for complete search history.

(56) References Cited

U.S. PATENT DOCUMENTS 4,207,027 A    6/1980 Allen
4,218,179 A    8/1980 Artt et al.
(Continued)

FOREIGN PATENT DOCUMENTS

CA    2080183 A1    5/1993
DE    2735362 A1    2/1979
(Continued)

OTHER PUBLICATIONS

CN Decision of Rejection dated Oct. 18, 2016, for CN patent application No. 201380030161.9.
(Continued)

*Primary Examiner* — Logan Kraft
*Assistant Examiner* — Jason Davis
(74) *Attorney, Agent, or Firm* — Beusse Wolter Sanks & Maire

(57) ABSTRACT

A coolant bridging line for a gas turbine having inner and outer sides which are separated by a wall, wherein the coolant bridging line extends from a first component of the gas turbine to a second component of the gas turbine is provided herein. The coolant bridging line for a gas turbine provides a further increase in the service life of the components of the gas turbine possible with a degree of efficiency which is nevertheless as high as possible. To this end, the coolant bridging line has means which change the heat transfer between and/or the flow conditions on the inner and outer sides.

10 Claims, 3 Drawing Sheets

(51) Int. Cl.
*F01D 5/18* (2006.01)
*F01D 5/14* (2006.01)

(52) U.S. Cl.
CPC ........ *F01D 5/189* (2013.01); *F05D 2260/201* (2013.01); *F05D 2260/2212* (2013.01); *F05D 2260/231* (2013.01); *F05D 2300/20* (2013.01); *Y02T 50/675* (2013.01)

(56) References Cited

U.S. PATENT DOCUMENTS

| | | |
|---|---|---|
| 4,314,442 A | 2/1982 | Rice |
| 4,550,569 A | 11/1985 | Isa et al. |
| 4,565,490 A | 1/1986 | Rice |
| 5,253,976 A | 10/1993 | Cunha |
| 5,340,274 A | 8/1994 | Cunha |
| 5,746,574 A * | 5/1998 | Czachor ............. F01D 5/189 285/368 |
| 6,177,200 B1 | 1/2001 | Maloney |
| 6,284,323 B1 | 9/2001 | Maloney |
| 7,658,591 B2 | 2/2010 | Dervaux |
| 2003/0175122 A1 | 9/2003 | Darolia |
| 2007/0122281 A1 | 5/2007 | Snecma |
| 2008/0006394 A1* | 1/2008 | Gupta ................. B60H 1/00 165/104.21 |
| 2010/0054915 A1 | 3/2010 | Abdel-Messeh |

FOREIGN PATENT DOCUMENTS

| | | |
|---|---|---|
| EP | 0543627 A | 5/1993 |
| EP | 0543627 A1 | 5/1993 |
| EP | 1783326 A1 | 5/2007 |
| EP | 3054624 A1 | 8/2016 |
| GB | 1555587 A | 11/1979 |
| JP | S59229003 A | 12/1984 |
| JP | H01110810 A | 4/1989 |
| JP | H055402 A | 1/1993 |
| JP | H05005402 A | 1/1993 |
| JP | H05214957 A | 8/1993 |
| JP | H05240064 A | 9/1993 |
| JP | 2007132347 A | 5/2007 |
| JP | 2010255542 A | 11/2010 |
| RU | 2228389 C2 | 5/2004 |

OTHER PUBLICATIONS

JP Office Action dated Aug. 29, 2016, for JP application No. 2015515445.

* cited by examiner

COOLANT BRIDGING LINE FOR A GAS TURBINE, WHICH COOLANT BRIDGING LINE CAN BE INSERTED INTO A HOLLOW, COOLED TURBINE BLADE

CROSS REFERENCE TO RELATED APPLICATIONS

This application is the US National Stage of International Application No. PCT/EP2013/059859 filed May 14, 2013, and claims the benefit thereof. The International Application claims the benefit of German Application No. DE 102012209549.7 filed Jun. 6, 2012. All of the applications are incorporated by reference herein in their entirety.

FIELD OF INVENTION

The invention relates to a coolant bridging line for a gas turbine, which coolant bridging line can be inserted into a hollow, cooled turbine blade and has inner and outer sides separated by a wall, wherein the coolant bridging line extends from a first component of the gas turbine to a second component of the gas turbine.

BACKGROUND OF INVENTION

A gas turbine is a turbomachine in which a gas under pressure expands. It includes a turbine or expander, a compressor connected upstream thereof, and a combustor connected between the two. All of the blades of the compressor and of the turbine are referred to collectively as the blading. In that context, a distinction is drawn between rotor blades and guide blades. A ring of rotor blades, together with the associated ring of guide blades, is referred to as a stage. It is common for the blading of the turbine or of the compressor to be multistage.

The guide blades are fixedly integrated into the casing of the compressor or of the turbine and guide the working medium (intake air or hot gas) at the optimum angle onto the rotor blades, which are on rotating shafts. The coupling of the mechanically useful power, between the machine and the fluid, occurs via the rotor blades.

The working principle is based in this context on the cyclic process (Joule process): this compresses air by means of the blading of one or more compressor stages, then mixes this air with a gaseous or liquid fuel in the combustor and ignites and combusts the mixture. In addition, the air is used for cooling, in particular of components subjected to high thermal stresses. This produces a hot gas (a mixture of combustion gas and air) which expands in the subsequent turbine part, wherein thermal energy is converted to mechanical energy and then drives the compressor. In a shaft engine, the remaining portion is used to drive a generator, a propeller or other rotating loads. In a jet engine, by contrast, the thermal energy accelerates the hot gas stream, producing thrust.

The hot gas subjects components of gas turbines to high thermal stresses. An increase in operating temperatures is also desirable as it allows improvements in efficiency to be achieved. In order that the material temperatures do not exceed the strength limits, a supply of coolant, for example air, is therefore provided. On the way to the provided point of action of the coolant, the latter is however already heated by the high temperatures. This heating can, in certain circumstances, be so great that the provided cooling effect of the coolant at the point of action is too small. This increases the thermal load and thus reduces the service life of the component at the point of action. In this case, the coolant is therefore frequently conveyed in separate coolant bridging lines.

SUMMARY OF INVENTION

Embodiments of the invention are hence based on an object of indicating a coolant bridging line which permits a further increase in the service life of the components of the gas turbine, and at the same time the highest possible efficiency.

This object is achieved according to an embodiment of the invention in that the coolant bridging line which can be inserted into a hollow, cooled turbine blade has means which change the heat transfer between—and/or the flow conditions at—the inner and outer sides.

Embodiments of the invention proceed from the consideration that the heating of the coolant by interaction with the surrounding component results in a decrease in service life. In this context, it has surprisingly been found that the coolant bridging lines used have hitherto in no way been used to improve service life while maintaining a constant efficiency. For that reason, the coolant bridging lines which can be inserted into a hollow, cooled turbine blade should have means which change the heat transfer between the inner and outer sides of the line or which change the flow conditions inside or outside the wall, in order to achieve an improvement here.

Advantageously, the coolant bridging line is in this context inserted within a guide blade of the gas turbine. Moreover, the first and/or the second component, between which the coolant bridging line extends, is respectively a blade root or a blade head. The supply of coolant to the inner ring, to which the guide blade heads are attached, is namely particularly advantageous through the guide blades, since the paths are particularly short. However, it is specifically between the guide blade root and the guide blade head that the thermal load on the coolant which is to be conveyed through—but as far as possible not heated—is particularly high. For that reason, when guiding the coolant through from the guide blade root at the outer diameter of a guide blade ring to the guide blade head at the inner diameter of the guide blade ring, the guide blades should be equipped with coolant bridging lines.

In one advantageous configuration, the means provided on the coolant bridging line are designed such that they change the thermal conduction between the inner and outer sides, i.e. an enthalpy transfer need not necessarily occur by means of convection.

Advantageously, the means comprise to that end a coating which, also advantageously, comprises a ceramic material. Less thermal energy is thus introduced into the coolant bridging line since the interaction between the coolant transported within and the surroundings is reduced. This improves the cooling effect of the coolant at the point of action, since the efficiency of the coolant transport is increased.

In an alternative or additional configuration, the means comprise turbulators. This is particularly advantageous if some components to be cooled cause excessive consumption of coolant. Such excessive consumption namely reduces the efficiency of the entire gas turbine. With the aid of turbulators, which are arranged on the inside of the wall of the coolant bridging line, eddies are generated such that the pipe resistance in the line increases and thus the pressure loss is increased. Alternatively or in addition, turbulators may also be affixed to the outer side of the coolant bridging line. This also raises a possibility of increasing the flexibility of configuration. Since turbulators of this type on the outer side increase the introduction of heat into the coolant flowing inside the bridging line, this variant may advantageously be combined with the coating.

In a further advantageous configuration, the means comprise a number of openings in the wall of the coolant bridging line. A configuration of this type offers particular advantages if, during operation, components in the region of the coolant line experience a high thermal load. Specifically if an excessive thermal load is detected only when the gas turbine is in operation, i.e. after the construction phase, comprehensive constructive changes are frequently associated with high costs and technical complexity. In this case, by introducing openings into the coolant bridging line, it is possible to provide relief quickly and cost-effectively, since in affected areas coolant from the bridging line reaches the affected component directly as an impingement coolant. According to a further advantageous configuration, as the means for changing the heat transfer, the wall is of hollow design. By virtue of this configuration, which is to be referred to as a double-walled construction, thermal conduction from the outer side to the inner side is further reduced, by means of which, when the coolant bridging line is used as intended in a relatively hot environment, the introduction of heat into the coolant flowing along the inner side is kept comparatively low. Preferably, in that context, the cavity of the wall is hermetically sealed with respect to the inner side and the outer side, such that an exchange or even mixing of hotter, outer medium with the cavity medium is prevented. The sealing thus results in reduced thermal conductivity of the cavity medium. More preferably, the pressure within the cavity is negative with respect to an average atmospheric pressure. The lower the cavity pressure, the more medium was removed from the cavity before the latter was sealed and the lower its thermal conductivity, which has the effect of keeping the temperature of the coolant flowing along the inner side more constant.

For practical reasons, the coolant bridging line is of tubular design, or even designed as a double-walled tube, in an embodiment.

A gas turbine advantageously has a coolant bridging line as described and is advantageously part of a power plant installation.

The advantages associated with embodiments of the invention include in particular in the fact that, by virtue of the modification to the coolant bridging lines with respect to their thermal and fluidic properties, a flexible adaptation to temperature distributions within a gas turbine, which arise during operation, becomes possible. By virtue of such modifications, quick solutions to problems, for example in the event of excessive temperatures at individual components, are possible. The coolant bridging line thus serves the dual purpose of transporting coolant and cooling or controlling pressure losses in the cooling system.

BRIEF DESCRIPTION OF THE DRAWINGS

Aspects of the invention are described in more detail with reference to a drawing, in which.

DETAILED DESCRIPTION OF INVENTION

Identical parts are provided with the same reference signs in all figures.

Figure 1:
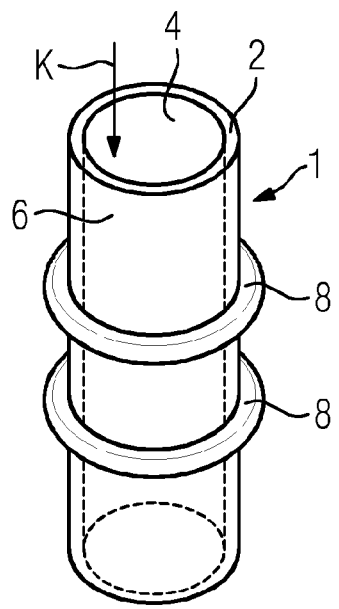
FIG. 1 shows a coolant bridging line having annular turbulators arranged on the outside.

FIG. 1 shows a cylindrical coolant bridging line 1. This is inserted into a hollow, cooled turbine guide blade (not shown) and extends between the blade roots of the turbine guide blade. The coolant bridging line 1 has a wall 2 which separates the inner side 4 and the outer side 6 of the coolant bridging line 1. Coolant K, in the exemplary embodiment air, is conveyed inside the coolant bridging line 1.

Figure 2:
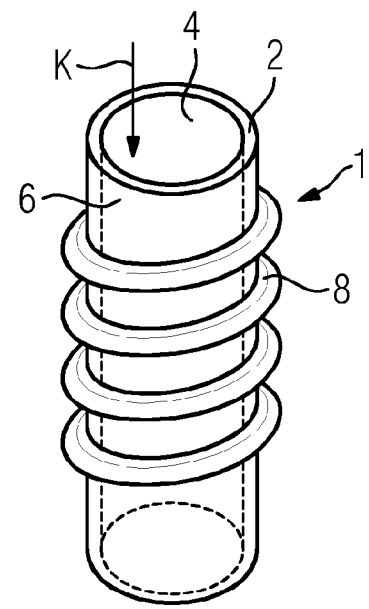
FIG. 2 shows a coolant bridging line having helical turbulators arranged on the outside.

Annular turbulators 8 are arranged on the outer side 6. In the alternative exemplary embodiment according to FIG. 2, however, the turbulators 8 are arranged in a helical manner. Equally, turbulators not shown in more detail can be arranged on the inner side of the coolant bridging line 1. In addition, the coolant bridging lines according to FIGS. 1 and 2 are provided with a ceramic coating.

Figure 3:
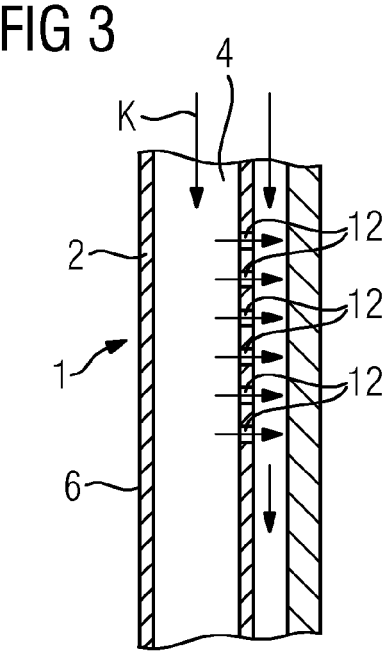
FIG. 3 shows a partial section through the end side of a turbine blade.

FIG. 3 shows a coolant bridging line 1 together with the adjacent end side 10 of the guide blade into which it is inserted. The end side 10 is subjected to comparatively high thermal loading. For that reason, openings 12 are created in the coolant bridging line 1, through which openings the coolant K exits and flows onto the inner side of the end side 10 in the manner of impingement cooling. The end side 10 is thus cooled.

Figure 4:
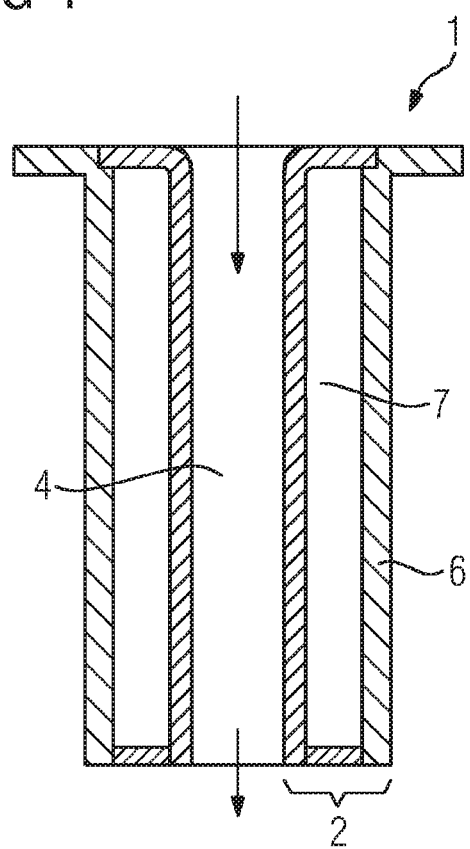
FIG. 4 shows a section through a double-walled coolant bridging line and FIG. 5 shows a section through a gas turbine.

FIG. 4 also shows a cylindrical, that is to say tubular, coolant bridging line 1. This is also arranged inside a turbine guide blade (not shown) and extends from the blade root via the blade airfoil to the blade head. The coolant bridging line 1 has, in contrast to FIG. 1, a hollow wall 2 between its inner side 4 and outer side 6. The wall 2 is thus double-walled and equipped with a cavity 7. The cavity 7 can then be separated from the inner side 4 and/or from the outer side 6. In the case of hermetic separation of the cavity 7 from the spaces which are also delimited by the inner side 4 and/or also the outer side 6, it is expedient, for minimizing the thermal conduction, to at least partially evacuate the cavity 7. The input of heat from outside to the coolant K flowing inside the coolant bridging line 1 can thus be kept particularly low.

Figure 5:
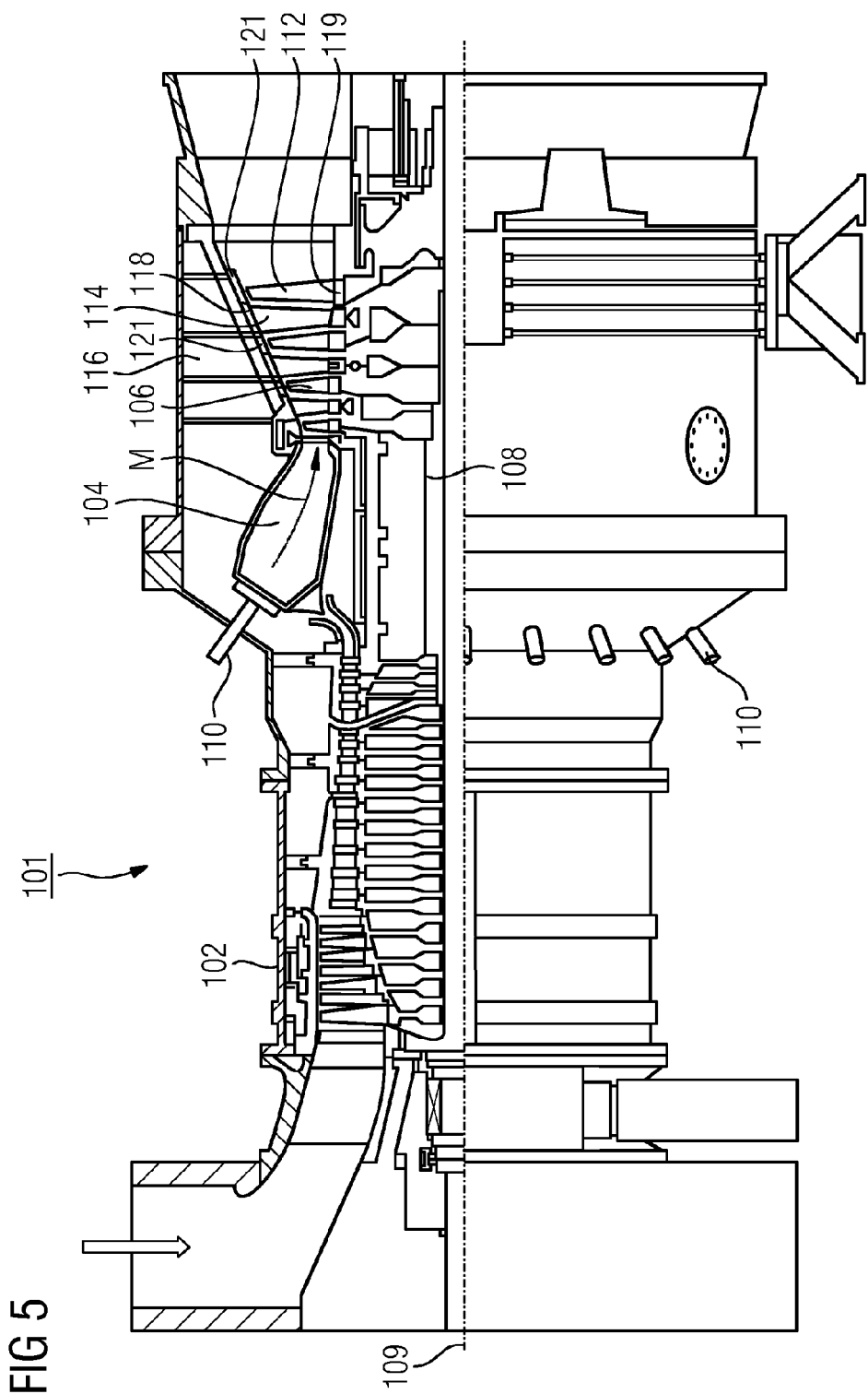

The described coolant bridging lines are used in a gas turbine 101 according to FIG. 5. The gas turbine 101 is intended for use in a power plant for generating electrical current.

A gas turbine 101 as shown in FIG. 5 has a compressor 102 for combustion air, a combustor 104 and a turbine unit 106 for driving the compressor 102 and a generator (not shown) or a work machine. To that end, the turbine unit 106 and the compressor 102 are arranged on a common turbine shaft 108, also termed the turbine rotor, to which the generator or, as the case may be, the work machine is also connected, and which is mounted rotatably about its central axis 109. These units form the rotor of the gas turbine 101. The combustor 104, which is embodied as an annular combustor, is equipped with a number of burners 110 for burning a liquid or gaseous fuel.

The turbine unit 106 has a number of rotary rotor blades 112 which are connected to the turbine shaft 108. The rotor blades 112 are arranged in a ring shape on the turbine shaft 108 and thus form a number of rotor blade rings or rows. The turbine unit 106 further comprises a number of stationary guide blades 114 which are attached, also in a ring shape, to a guide blade carrier 116 of the turbine unit 106 so as to form guide blade rows. The rotor blades 112 serve in this context to drive the turbine shaft 108 by impulse transfer from the working medium M which flows through the turbine unit 106. The guide blades 114 serve, on the other hand, to guide the flow of the working medium M between in each case two successive—as seen in the direction of flow of the working medium M—rotor blade rows or rotor blade rings. A successive pair, having a ring of guide blades 114 or a guide blade row and of a ring of rotor blades 112 or a rotor blade row, is in this context also termed a turbine stage.

Each guide blade 114 has a platform 118 which is arranged as a wall element for fixing the respective guide blade 114 to a guide blade carrier 116 of the turbine unit 106. The platform 118 is in this context a component which is subjected to comparatively high thermal loads and which forms the outer limit of a hot gas channel for the working medium M which flows through the turbine unit 106. Each rotor blade 112 is, in analogous fashion, attached to the turbine shaft 108 by means of a platform 119, also termed the blade root.

A ring segment 121 is in each case arranged on a guide blade carrier 116 of the turbine unit 106 between the spaced apart platforms 118 of the guide blades 114 of two adjacent guide blade rows. The outer surface of each ring segment 121 is in this context also exposed to the hot working medium M flowing through the turbine unit 106, and is separated in the radial direction from the outer end of the rotor blades 112 located opposite by a gap. The ring segments 121 arranged between adjacent guide blade rows serve in this context in particular as covering elements which protect the interior housing in the guide blade carrier 116, or other integrated housing parts, from thermal overloading caused by the hot working medium M which is flowing through the turbine 106.

In the exemplary embodiment, the combustor 104 is configured as what is termed an annular combustor, wherein a multiplicity of burners 110, arranged around the turbine shaft 108 in the circumferential direction, open into a common combustor space. To that end, the combustor 104 is configured in its entirety as an annular structure which is positioned around the turbine shaft 108.

The invention claimed is:

1. A coolant bridging line for a gas turbine, which coolant bridging line can be inserted into a hollow, cooled turbine blade and has inner and outer sides separated by a wall, wherein the coolant bridging line extends from a first component of the gas turbine to a second component of the gas turbine,
    wherein the wall comprises an inner wall, an outer wall, and a cavity between the inner wall and the outer wall, and
    wherein ends of the inner wall and the outer wall are sealed to each other, thereby sealing the cavity closed.

2. The coolant bridging line as claimed in claim 1, which is arranged within a guide blade of the gas turbine.

3. The coolant bridging line as claimed in claim 2, wherein the first component is a blade root and the second component is a blade head.

4. The coolant bridging line as claimed in claim 2, in which the first component is a blade head and the second component is a blade root.

5. The coolant bridging line as claimed in claim 1, wherein the cavity of the wall is hermetically sealed closed.

6. The coolant bridging line as claimed in claim 5, wherein the cavity is at least partially evacuated.

7. The coolant bridging line as claimed in claim 1, which, for the purpose of conveying a coolant, is of tubular internal design.

8. A turbine guide blade having a hollow blade airfoil, within which a coolant bridging line as claimed in claim 1 is arranged.

9. A gas turbine having a turbine guide blade as claimed in claim 8.

10. A power plant installation having a gas turbine as claimed in claim 9.

* * * * *